(12) United States Patent
Matsuda et al.

(10) Patent No.: US 6,873,427 B1
(45) Date of Patent: Mar. 29, 2005

(54) COLOR IMAGE FORMING APPARATUS

(75) Inventors: Yoji Matsuda, Kanagawa-ken (JP); Yuji Rikima, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1112 days.

(21) Appl. No.: 09/594,496

(22) Filed: Jun. 15, 2000

(30) Foreign Application Priority Data

Aug. 27, 1999 (JP) .......................................... P11-242120

(51) Int. Cl.[7] .............................................. G06K 15/00
(52) U.S. Cl. ..................................... 358/1.15; 358/1.1
(58) Field of Search .............................. 358/1.15, 1.1, 358/1.4, 1.6, 1.12, 1.13, 1.14, 1.16, 1.17, 408, 474, 486, 488, 498, 296, 437, 444, 434, 468

(56) References Cited

U.S. PATENT DOCUMENTS 5,528,374 A * 6/1996 Matias ........................ 358/296

FOREIGN PATENT DOCUMENTS

JP 2579043 11/1996
JP 2003110774 A * 4/2003 ............ H04N/1/00

* cited by examiner

*Primary Examiner*—Arthur G. Evans
(74) *Attorney, Agent, or Firm*—Foley & Lardner LLP

(57) ABSTRACT

The color image forming apparatus forms color images on a recording medium using the reading unit for continuously reading color images from a plurality of documents to output color image data corresponding to the color images and a plurality of image forming units which are provided to form images for a plurality of color signals constituting the color image data on the basis of the color image data read by the reading unit. In the color image forming apparatus, the reading unit is controlled to start reading of a next document of the document corresponding to the images under image forming when the predetermined image forming unit finishes image forming among the plurality of image forming units before the color image forming is finished.

17 Claims, 12 Drawing Sheets

COLOR IMAGE FORMING APPARATUS

BACKGROUND OF THE INVENTION

1. Field of the Invention

The present invention relates to a color image forming apparatus of a system having a plurality of photo-conductive drums and more particularly to a color image forming apparatus for starting reading of the next document before a recording medium passes through all the photo-conductive drums, thereby improving the processing capacity per unit time.

2. Description of the Related Art

Recently, digital color copying machines have been widely developed and spread rapidly. These digital color copying machines have a photo-conductive drum unit for forming an image for each ink color component such as a magenta cyan, and yellow.

Such a digital color copying machine is broadly divided into two kinds of systems such as a single-drum system which has one transfer drum unit and performs a plurality of times of image input and transfer operation for each color component to be transferred and a double-drum system which has a transfer drum unit for each color component and perform the transfer operation of all color components by one image input.

The single-drum system performs the scanner operation and image forming process for each color component. Therefore, since the document input operation is required to perform several times for one document, there is an aspect that the processing time for one document is prolonged. The timing for realizing the scanner operation for the next document is at the lowest the point of time when the scanner operation for the last color is finished, so that there is an aspect that there is a mechanical weak point in the document input process for increasing the speed.

On the other hand, the double-drum system performs the image forming process for an image input by one document input operation using the transfer drum unit for the ink color. Therefore, only one document input operation is sufficient for one document, so that a comparatively faster processing speed can be realized compared with the single-drum system.

However, even in the double-drum system, in one image forming, unless the image forming operations by a plurality of transfer drum units for the ink colors are all completed respectively, the next document input operation cannot be started, so that there is a structural problem imposed that particularly as compared with a monochromatic copying machine, a sufficient processing speed cannot be obtained.

Namely, unless a conventional color image forming apparatus waits until a recording medium passes through all of a plurality of transfer drum units for every color and then starts the document input operation for the next document, the data of the next document is overwritten on the previous document data, so that after a recording medium passes through all the transfer drum units for each document, the apparatus performs the document input process for the next document. However, in this case, the recording medium supply interval during copying of each document is increased and there is a problem imposed that the copying operation for unit time is not made faster sufficiently.

SUMMARY OF THE INVENTION

An object of the present invention is to provide a color image forming apparatus for intending to speed up a color image forming apparatus of the plural-drum system and improving the processing capacity per unit time by starting the reading process of the next document without waiting for completion of the image forming process of the previous document.

According to the present invention, a color image forming apparatus is provided and the color image forming apparatus is composed of reading means for continuously reading color images from a plurality of documents to output color image data corresponding to the color images; color image forming means for forming color images on a recording medium using a plurality of image forming units which are provided to form images for a plurality of color signals constituting the color image data on the basis of the color image data read by the reading means; and control means for controlling the reading means to start reading of a next document of the document corresponding to images under image forming when a predetermined image forming unit finishes image forming among the plurality of image forming units before the color image forming is finished.

DETAILED DESCRIPTION OF THE PREFERRED EMBODIMENTS

Preferred an embodiment of the color image forming apparatus of the present invention will be explained hereunder referring to the attached drawings.

Figure 1:
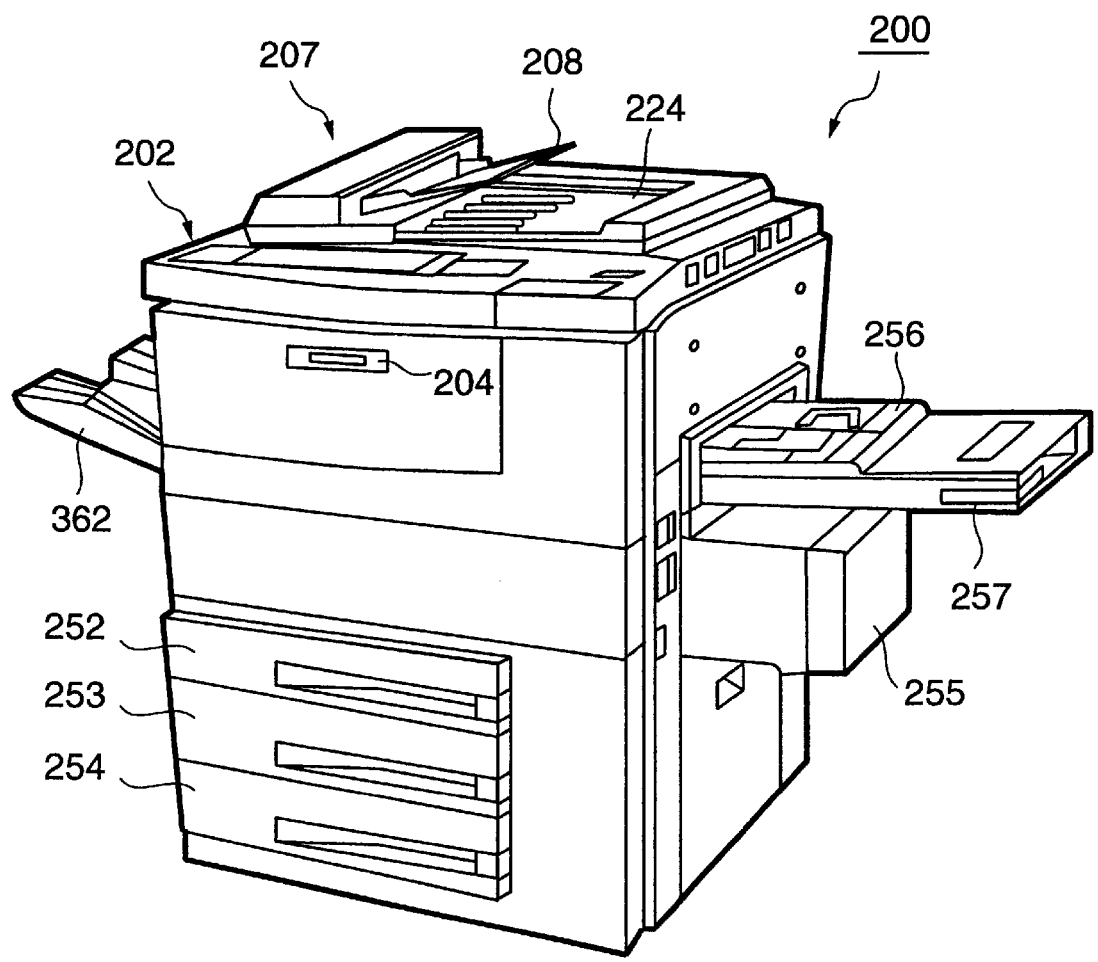
FIG. 1 is a perspective view showing an embodiment of the color image forming apparatus of the present invention.

FIG. 1 is a perspective view showing the appearance of the color image forming apparatus of the present invention.

On the top of a main body 200, an automatic document feeder (hereinafter, referred to as ADF) 207 serving as a document cover for automatically feeding sheet-shaped documents one by one is installed so as to be opened or closed freely. On the front of the top of the main body 200, an operation panel 202 having various operation keys for instructing copy conditions and copy start and various indicators is installed. The operation panel 202 will be explained later in detail.

On the right side of the main body 200, a paper supply cassette 257 for storing a small number of papers and a large volume paper supply cassette 255 for storing a large number of papers are installed respectively in a removable state. The paper supply cassette 257 has a manual paper supply tray 256 for supplying papers by hand.

At the bottom of the main body 200, paper supply cassettes 252, 253, and 254 are installed in a removable state. In each cassette, copy papers different in size are loaded. The cassette storing copy papers in the desired size is selected as required. On the left side of the main body 200, a receiving tray 362 for receiving copied papers is installed.

At the bottom of the operation panel 202 on the front of the main body 200, an insertion port 204 for inserting a photomagnetic disk as a storage medium for strong image data is installed. Inside the main body 200, a photomagnetic disk device (not shown in the drawing) for driving the photomagnetic disk is installed.

On the back of the main unit 200, a parallel port (sot shown in the drawing), a serial port (not shown in the drawing), and an SCSI (small computer system interface) are installed. The parallel port, when the main body 200 is to operate as a printer, connects the main body 200 to an external device such as a PC (personal computer). The serial port connects the main body 200 to an external device such as a PC so as to read the internal management information of the main body 200 at the time of maintenance of the main body 200 and set the function of the main body 200. The SCSI executes command/data communication between the main body 200 and an external controller operating as a master.

Figure 2:
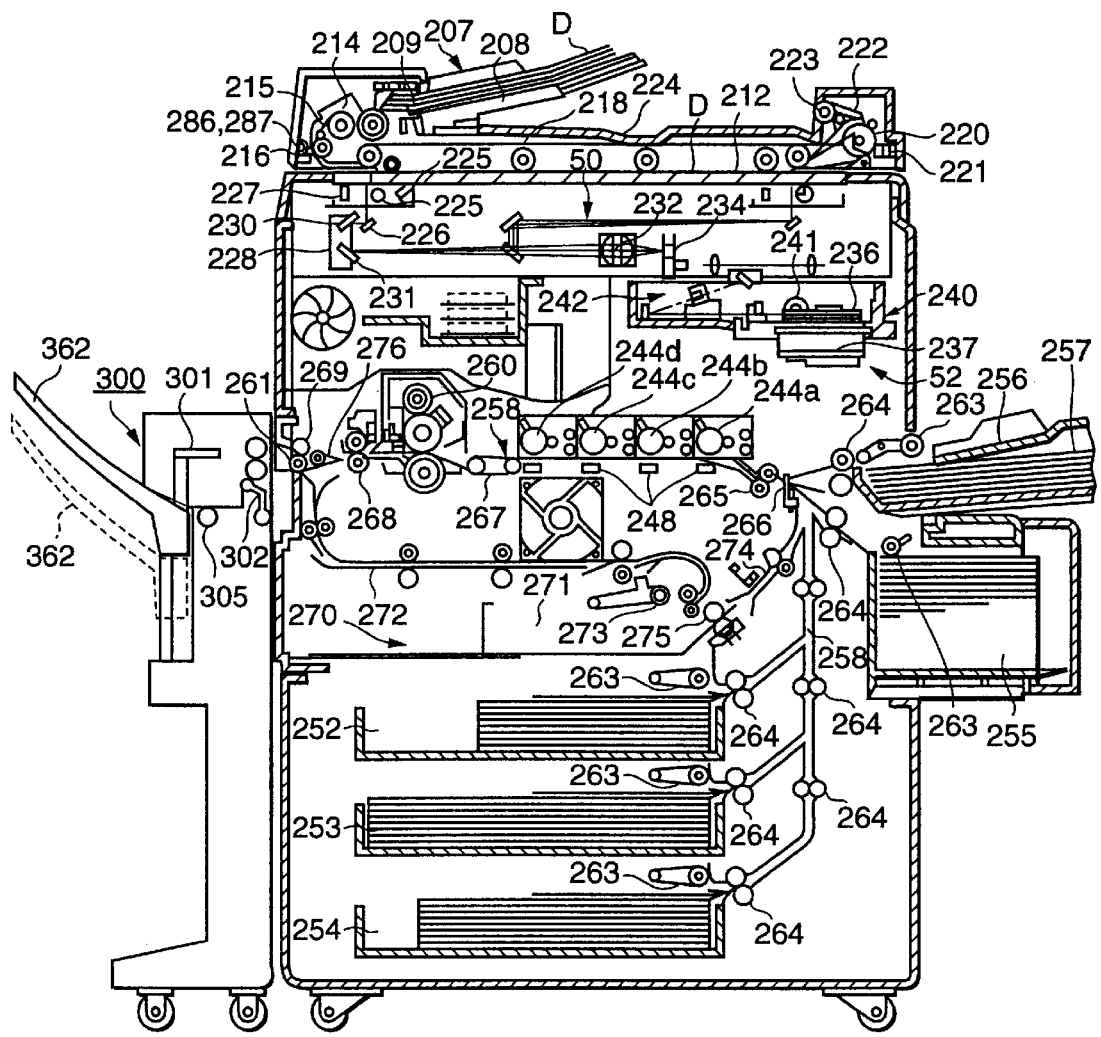
FIG. 2 is a drawing showing an internal constitution example of the color image forming apparatus shown in FIG. 1.

FIG. 2 is a schematic diagram structurally showing an example of the internal constitution of the color image forming apparatus shown in FIG. 1.

Inside the main body 200, a scanner unit 50 as an acquisition means for acquiring image data when the copy function and facsimile function are to be realized and an image forming unit 52 as an image forming means are installed.

On the top of the main body 200, a document table 212 composed of transparent glass on which a document D as a reading object is loaded and an ADF 207 for automatically feeding a document onto the document table 212 are arranged. The ADF 207 is arranged so as to be opened or closed for the document table 212 and it also functions as a document presser for closely adhering the document D loaded on the document table to the document table 212.

The ADF 207 has the document tray 208 in which the document D is set, an empty sensor 209 for detecting the existence of a document, a pick-up roller 214 for taking out documents from the document tray one by one, a feed roller 215 for conveying a taken-out document, an aligning roller pair 216 for aligning the end of a document, an aligning sensor 286 which is installed on the upstream side of the aligning roller pair 216 and detects arrival of a document, a size sensor 287 for detecting the size of the document D, and a conveyor belt 218 is arrange so as to cover almost overall the document table 212. A plurality of documents set upward on the document tray 208 are taken out sequentially from the lowest page, that is, the last page, aligned by the aligning roller 216, and then conveyed to the predetermined position of the document table 212.

In the ADF 207, at the end on the opposite side of the aligning roller pair 216 across the conveyor belt 218, a converting roller 220, a non-converting sensor 221, a flapper 222, and an exit roller 223 are arranged. The document D that the image information is read by the scanner unit 50 which will be described later is fed out from the document table 212 by the conveyor belt 218 and ejected onto a document outlet portion 224 on the top of the ADF 207 via the converting roller 220, the flapper 222, and the exit roller 223.

When the back of the document D is to be read, by switching the flapper 222, the document D conveyed by the conveyor belt 218 is reversed by the converting roller 220 and then sent to the predetermined position on the document table 212 again by the conveyor belt 218.

The ADF 207 has the pick-up roller 214, the feed roller 215, the paper supply motor for driving the aligning roller pair 216, the conveyor belt 218, the converting roller 220, and the conveyor motor for driving the exit roller 223.

The scanner unit 50 arranged in the main body 200 has a light source 225 such as a fluorescent lamp for illuminating the document loaded on the document table 212 and a first mirror 226 for deflecting the reflected light from the document D in the predetermined direction. The light source 225 and the first mirror 226 are attached to a first carriage 227 arranged below the document table 212. On the first carriage 227, a size sensor for detecting the size of a document loaded on the document table 212 is attached. The first carriage 227 is arranged so as to move in parallel with the document table 212 and moves back and forth under the document table by the drive motor via a toothed belt not shown in the drawing.

Under the document table 212, a second carriage 228 which can move in parallel with the document table is arranged. On the second carriage 228, second and third mirrors 230 and 231 for sequentially deflecting the reflected light from the document D which is deflected by the first mirror 226 are attached perpendicularly to each other. The second carriage 228 follows the first carriage 227 by the toothed belt for driving the first carriage 227 and moves in parallel along the document table 212 at a speed of ½ of that of the first carriage.

Under the document stable 212, a focusing lens 232 for focusing the reflected light from a third mirror 231 on the second carriage 228 and a CCD sensor 234 for receiving the reflected light focused by the focusing lens and photoelectrically converting it are arranged. The focusing lens 232 is arranged so as to move in the surface including the optical axis of the light deflected by the third mirror 231 via the drive mechanism and focuses the reflected light at the desired magnification by moving itself. The CCD sensor photoelectrically converts the entered reflected light and outputs an electric signal corresponding to the read document D.

The image forming unit 52 has a laser exposing device 240 to be used as an exposing means. The laser exposing device 240 has a semiconductor laser 241 as a light source, a polygonal mirror 236 as a scanning member for continuously deflecting a laser beam emitted from the semiconductor laser 241, a polygonal mirror drive motor 237 as a scanning motor rotating and driving the polygonal mirror at the predetermined number of revolutions which will be described later, and an optical system 242 for deflecting a laser beam from the polygonal mirror and leading it to the photo-conductive drum which will be described later. The laser exposing device 240 having such a constitution is fixed and supported by the support frame of the main body 200 which will be described later.

The semiconductor laser 241 is controlled on or off according to the image information of the document D which is read by the scanner unit 50 and the laser beam is directed toward photo-conductive drums 244a to 244d respectively via the polygonal mirror 236 and the optical system 242 and forms an electrostatic latent image on each drum periphery by scanning the periphery of each photo-conductive drum.

The image forming unit 52 has the photo-conductive drums 244a to 244d as image carriers which are arranged almost at the center of the main body 200 and rotate freely and on the periphery of each of the photo-conductive drums 244a to 244d, a desired electrostatic latent image exposed by the laser beam from the laser exposing device 240 is formed.

Around each of the photo-conductive drums 244a to 244d, a charger for charging each drum periphery at the predetermined charge, a developing machine for supplying toner as developer to an electrostatic latent image formed on each periphery of the photo-conductive drums 244a to 244d and developing it at the desired image density, a peeling charger (not shown in the drawing) for separating a material to be transferred supplied from paper supply cassettes 252, 253, 254, 255, and 257, that is, a copy paper P from the photo-conductive drums 244a to 244d, a transfer charger 248 for transferring toner images formed on the photo-conductive drums 244a to 244d to the paper P, a peeling pawl (not shown in the drawing) for peeling off a copy paper from each periphery of the photo-conductive drums 244a to 244d, a cleaning device (not shown in the drawing) for cleaning remaining toner on each periphery of the photo-conductive drums 244a to 244d, and a discharger (not shown in the drawing) for discharging each periphery of the photo-conductive drums 244a to 244d are arranged sequentially.

At the lower part of the main body 200, the paper supply cassettes 252, 253, and 254 which can be pulled cut from the main body 200 respectively are arranged in the mutually stacked state and copy papers different in size are loaded in each of the cassettes. Beside the cassettes, the large volume paper supply cassette 255 is installed and in the large volume paper supply cassette 255, about 300 copy papers in the size which is highly frequently used, for example, A4 size are stored. Above the large volume paper supply cassette 255, the paper supply cassette 257 serving as the manual paper supply tray 256 is mounted so as to be removed freely.

Inside the main body 200, a conveying path 258 extending through the transfer unit positioned between the photo-conductive drums 244a to 244d and the transfer charger 248 from each cassette is formed. At the end of the conveying path 258, a fixing device 260 is installed. On the side wall of the main body 200 opposite to the fixing device 260, an outlet port 261 is formed and at the outlet port 261, a finisher 300 is mounted. The finisher 300 will be explained later in detail.

In the neighborhood of the paper supply cassettes 252, 253, 254, 255, and 257, pick-up rollers 263 for taking out papers one by one from the cassettes are provided respectively. In the conveying path 258, many feed roller pairs 264 for conveying copy papers P taken out by the pick-up rollers 263 via the conveying path 258 are provided.

In the conveying path 258, on the upstream side of the photo-conductive drums 244a to 244d, a register roller pair 265 is provided. The register roller pair 255 corrects the slope of the taken-out copy paper. P, also aligns the end of a toner image on each of the photo-conductive drums 244a to 244d with the end of the copy paper P, and supplies the copy paper P to the transfer unit at the same speed as the moving speed of each periphery of the photo-conductive drums. On the operator's side of the register roller pair 265, that is, on the side of the feed roller 264, an aligning sensor 266 for detecting arrival of the copy paper P is provided.

The copy paper P taken out one by one from each of the cassettes by the pick-up roller 263 is sent to the register roller pair 265 by the feed roller pair 264. The copy paper P is aligned at the end by the register roller pair 265 and then sent to the transfer unit.

In the transfer unit, a developer image formed on each of the photo-conductive drums 244a to 244d, that is, a toner image is transferred onto the paper P by each of the transfer charger 248. The copy paper P on which the toner image is transferred is peeled off from each periphery of the photo-conductive drums 244a to 244d by the operations of the peeling charger and peeling claw and conveyed to the fixing device 260 via a conveyor belt 267 constituting a part of the conveying path 258. After the color developer image is melted and fixed on the copy paper P by the fixing device 260, the copy paper P is ejected to a receiving tray 362 of the finisher 300 via the outlet port 261 by a feed roller pair 268 and an exit roller pair 269.

Below the conveying path 258, a duplex device 270 for reversing the copy paper P passing through the fixing device 260 and sending it to the register roller pair 265 again is provided. The duplex device 270 has a temporary stacker 271 for temporarily stacking the copy paper P, a converting path 272 for reversing the copy paper P which branches from the conveying path 258 and passes through the fixing device 260 and leading it to the temporary stacker 271, a pick-up roller 273 for taking out the copy papers P stacked on the temporary stacker one by one, and a feed roller 275 for supplying a taken-out paper to the register roller pair 265 via a conveyor path 274. At the branching portion of the conveying path 258 and the converting path 272, a switching gate 276 for selectively switching the copy paper P to the outlet port 0.261 or the converting path 272 is provided.

When a duplex copy is to be performed, the copy paper P passing through the fixing device 260 is led to the converting path 272 by the switching gate and temporarily stacked in the temporary stacker 271 in the reversed state, and then sent to the register roller pair 265 via the conveyor path 274 by the pick-up roller 273 and the feed roller pair 275. The copy paper P is aligned by the register roller pair 265 and then sent to the transfer unit again and the toner image is transferred to the back of the copy paper P. Thereafter, the copy paper P is ejected to the receiving tray 362 of the finisher 300 via the conveying path 258, the fixing device 260, and the exit roller 269.

By use of the duplex device 270, a paper can be ejected with the printed side down. Namely, by the procedure of duplex copy, an image is transferred and fixed on the surface of a paper first, temporarily stacked on the temporary stacker 271, aligned by the register roller pair 265 via the conveyor path 274 by the pick-up roller 273 and the feed roller pair 275, and then ejected to the receiving tray 362 via the conveying path 258, the fixing device 260, and the exit roller 269.

Figure 3:
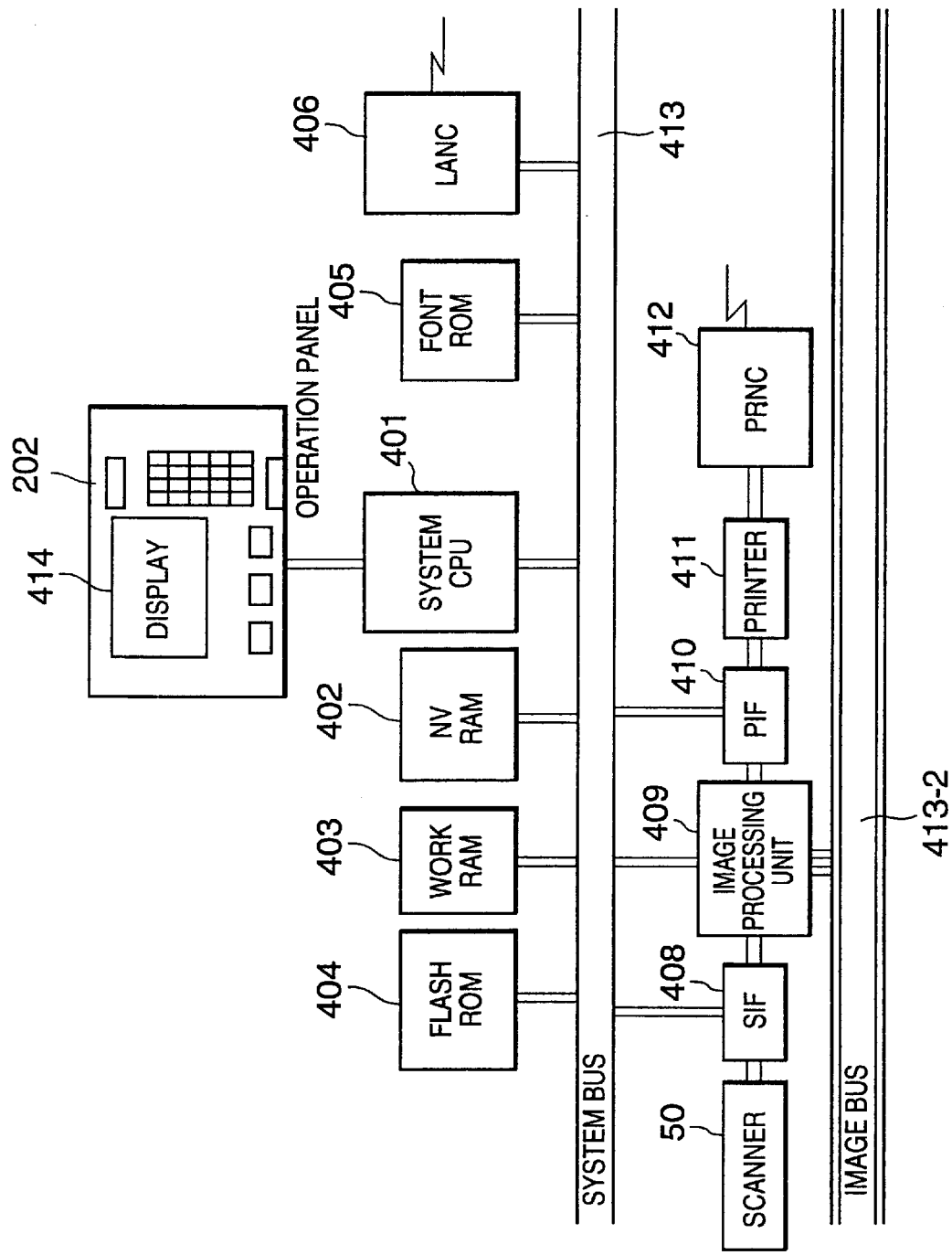
FIG. 3 is a block diagram showing the system configuration of the color image forming apparatus shown in FIG. 1.

FIG. 3 is a block diagram showing the constitution of the control system of the color image forming apparatus relating to an embodiment of the present invention. In FIG. 3, the main body 200 is composed of a system CPU 401, a flush ROM (for program storing and for data storing) 404, a font ROM 405, a nonvolatile RAM (NVRAM) 402, a work RAM (DRAM, for working and for data storing) 403, and a system bus 413 to which the aforementioned units are connected. Furthermore, to the system bus 413, the scanner 50 and an SIF (scanner interface) 408 is connected. Furthermore, to the system bus 413, an image processing unit 409, a PIF (printer interface) 410, a printer 411, and a PRNC (printer controller) 412 are connected. Furthermore, the main body 200 has an image bus 413-2 connected to the image processing unit 409. The system CPU 401 controls the whole apparatus and in this example, it controls each function on the basis of an instruction from the operation panel 202, on the basis of signal input from the communication circuit, and on the basis of input signals from various external interfaces.

The SIF 408 is a scanner interface for receiving image data from the scanner. The image processing unit 409 performs the image editing processes such as the high image quality process according to the recording device, magnification and reduction process, pixel thinning-out process, and reverse process of the designated area by marker detection. The LANC 406 is a network control circuit including a connector interface with Ethernet and a CPU for controlling a protocol such as a TCP or IP. One end of the cable of the LANC 406 is connected to a device constituting a network such as a router or repeater.

These devices are connected to each other via the image bus 413-2 and a control signal between the CPU and each device is sent and received at high speed by the system bus 413.

The image bus 413-2 is a unique device provided so as to allow the controller to operate as a copying machine and guarantees the real-time operation of the copying machine. For that purpose, image data input from the scanner is received by the SIF 408. For the received image data, the image processing unit 409 performs the high image quality process, magnification and reduction process, and various editing processes. On the basis of the processed image data, an operation of printer output by the printer is performed in parallel via the PIF 410 (called a basic copy). Among the boards connected to the image bus 413-2, the processing boards which are unnecessary for the operation at that time are in the passing state.

The PRNC unit 412 is a printer controller for performing protocol control and data transfer, compression, and expansion and contraction control for receiving print data from a device such as an external PC.

Figure 4:
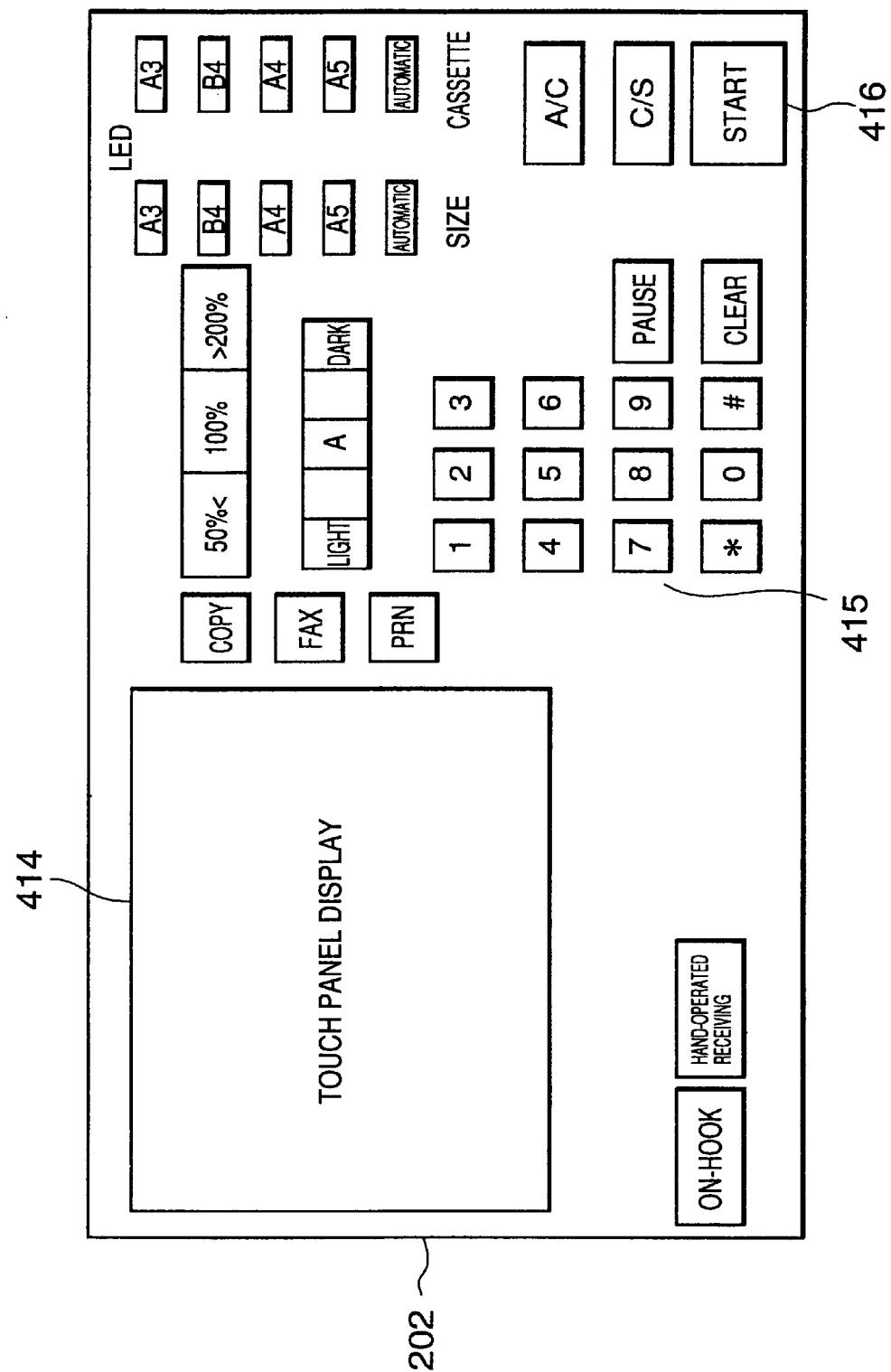
FIG. 4 is a plan view showing the operation panel of the color image forming apparatus shown in FIG. 1.

FIG. 4 shows the constitution of the operation panel 202. The operation panel 202 has a touch panel display 414, a start key 416, a stop key, a clear key, a ten-key pad 415 for setting a numeral value, keys for selecting the document size and cassette, LEDs for displaying the selected document size and cassette, copy magnification setting keys, and image mode selection keys. The ten-key pad 415 is arranged in the same way as with the ten-key arrangement of a button telephone device so as to be commonly used for both copy and facsimile.

For example, when 5 copies are to be printed, the menu on the display is switched to "Copy" and the desired process (duplex copy, etc.) is selected, and then the key "5" of the ten-key pad is pressed. Then, in the specific area on the touch panel display 414, the number is displayed. When the number is ascertained by a user, and then the document is set, and the start key 416 is pressed, the copy operation is started.

Figure 5:
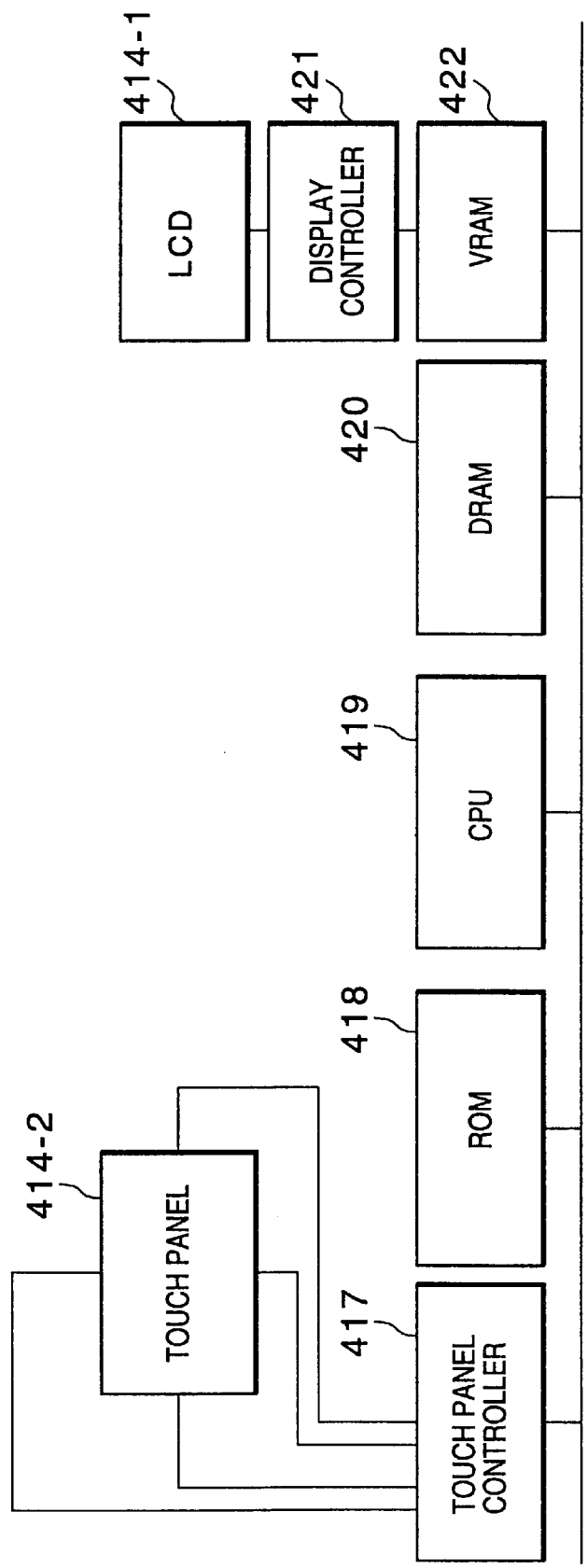
FIG. 5 is a block diagram showing the constitution of the touch panel display of the operation panel shown in FIG. 4.

FIG. 5 shows the constitution of the aforementioned touch panel display 414. The touch panel display 414 is structured by stacking a touch panel 414-2 on a liquid crystal display 414-1. Ir the touch panel 414-2, a transparent resistor is uniformly coated on a transparent board and transparent electrodes are arranged in parallel at the predetermined distance interval respectively in the X and Y directions. Under the control by a touch panel controller 417, a voltage is sequentially applied to the transparent electrodes in the X and Y directions in the fixed direction respectively. The position instruction operation for the touch panel 414-2 is performed using a dedicated conductive pen or a finger. The touch panel controller 417 monitors the resistances between respective electrodes in the X and Y directions and detects the position where the resistance is locally reduced by an instruction of the conductive pen or finger by calculating from the resistances between the electrodes.

To the liquid crystal display 414-1, a display controller 421 for displaying and driving it and a display RAM (VRM) 422 for storing display data in display pixel units are connected respectively.

In the touch panel display 414 having the aforementioned constitution, the position data obtained by the touch panel controller 417 is read by the CPU in the main controller. For example, when manual writing input is to be performed, the data on the VRAM 422 corresponding to the instructed position on the touch panel 141-2 is reversed from the non-display state to the display state and the touch panel display 414 can be used widely such as key board display on the liquid crystal display 414-1 or input of an operation parameter by selection among various setting buttons.

Figure 6:
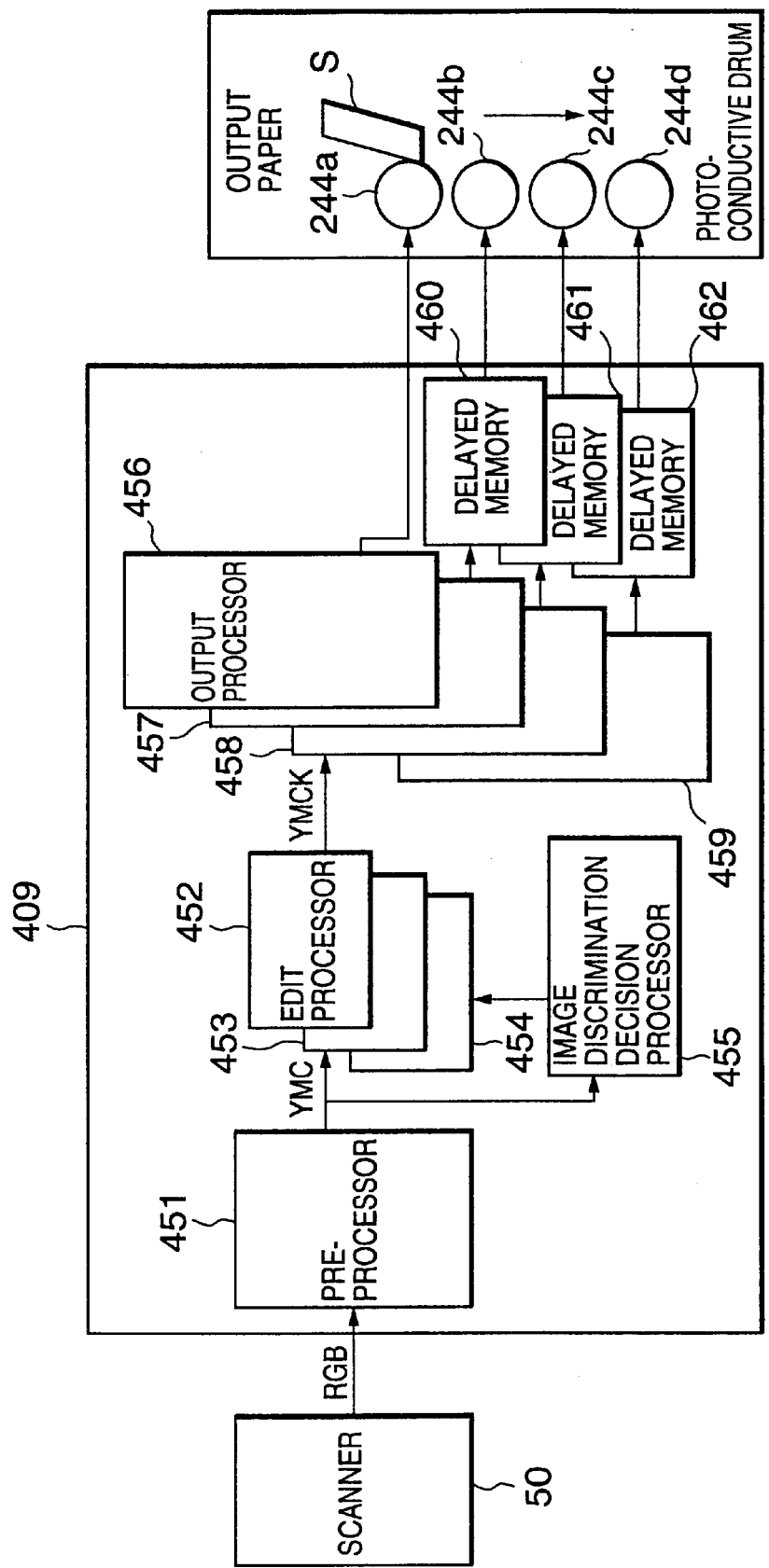
FIG. 6 is a conceptual view showing image processing units of the color image forming apparatus of the present invention and data flow.

FIG. 6 shows a constitution example and data flow of the IPU image processing circuit 409 shown in FIG. 3.

In the IPU image processing circuit 409, data input from the scanner 50 is sent to an edit processor 452 at the latter stage via a pre-processor 451 and an image discrimination decision processor 455. The pre-processor 451 performs a process of converting image data input by three elements of R, G, and B (red, green, and blue) to three elements of Y, M, and C (yellow, magenta, and cyan) components in printing, a process of determining the substrate level for reading the density of the document substrate, and a process of deciding color or monochrome for each pixel.

The edit processor at the latter stage performs the function for adjusting the data width of input image data according to the size of recording media and the copy magnification, various edit processes such as editing of the designated rectangular area such as trimming or masking and reversion of image data, and the process of data magnification and reduction.

The image discrimination decision processor 455, to analyze input data, decide the type of the document and shape of each part, and set image processing parameters according to them, outputs the decision result to the edit processor 452.

These processing data are sent to output processors 456, 457, 458, and 459 at the more latter stage. In this case, the image data is decomposed into four colors of Y, M, C, and K (black) which is added. The output processor 456 performs the gradation-process for gradating and representing binary data simulatively and an output high image quality process for converting an input signal to a signal indicating the toner discharge amount for each color component corresponding to the level thereof.

The image data decomposed into four color components via the output processors 456, 457, 458, and 459 is converted to the toner output level and sent to the image forming unit 52. The image forming unit 52 converts those data to the pulse width of an electric signal to the photo-conductive drum units 244a to 244d for each color component of Y, M, C, and K. On the basis of this electric signal, a color toner image is formed on the photo-conductive drums and the color toner image is transferred onto the recording medium S. The image forming unit 52 has a shape that these photo-conductive drum units 244a to 244d are arranged in series, and the recording medium S passes sequentially from the Y component in the example shown in this drawing, and a color image is formed on the recording medium S.

In this case, when the recording medium passes through from the first photo-conductive drum unit 244a to the last photo-conductive drum unit 244d, many time delays are generated. Therefore, at the latter stage of the second, third, and fourth output processors 457, 458, and 459, delayed memories 460, 461, and 462 are provided. The delayed memories 460, 461, and 462, to absorb these time delays, perform the part of buffer memories for temporarily accumulating output data from the output processors 457, 458, and 459 for the time that the recording medium passes through the distance of each of the photo-conductive drums.

The delayed memories 460, 461, and 462 are ring buffers and image data decomposed for each toner color component input from the document input means is accumulated behind the all page data. The counter indicating the position for reading data from the delayed memories 460, 461, and 462 counts data by hardware and when the counter is reset by software, the delayed memories 460, 461, and 462 can be initialized. With respect to this resetting, when a specific address area in the memory space is assigned so as to set an image processing parameter and a numerical value is written there, the control of the image processing control hardware by the software is made possible.

Figure 7:
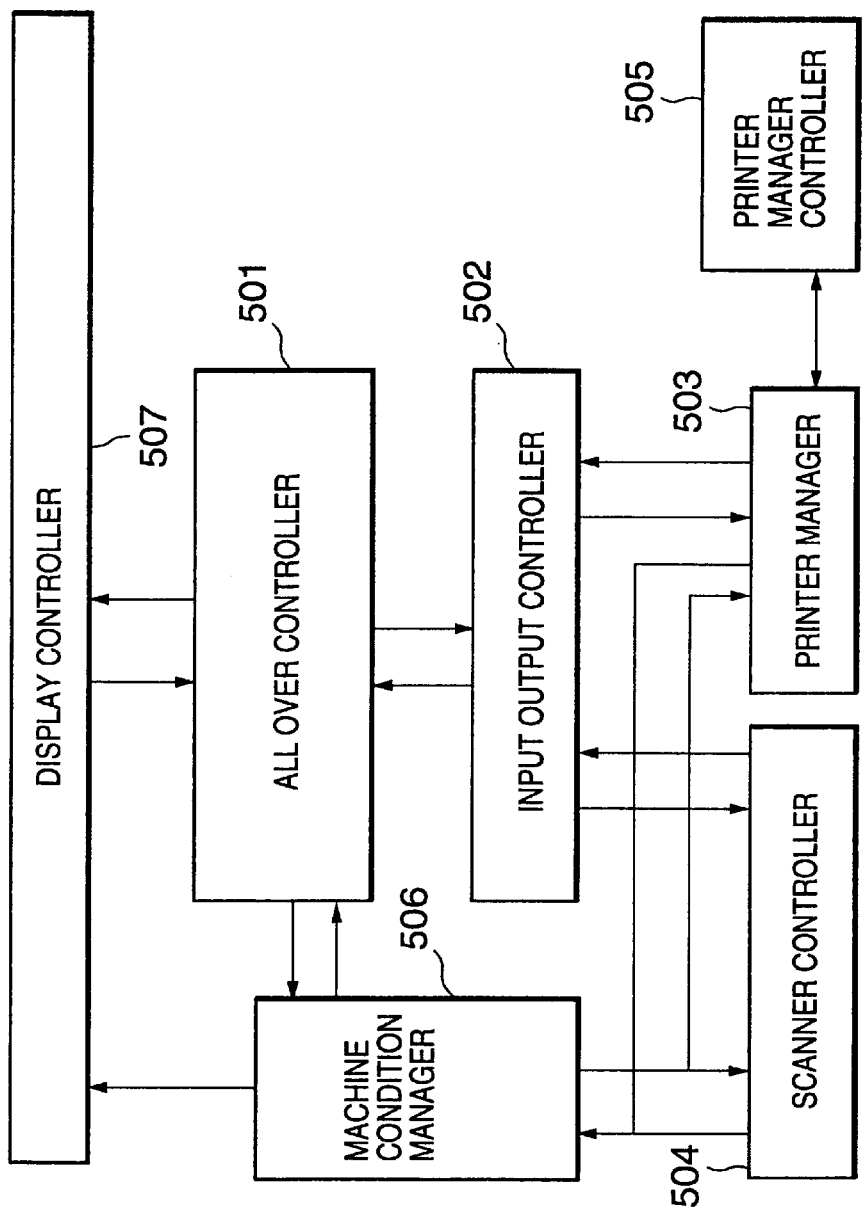
FIG. 7 is a control software block diagram of the color image forming apparatus of the present invention.

FIG. 7 is a function module block diagram constituting the apparatus of the present invention.

An overall controller 501 is connected to an input output controller 502, a machine condition manager 506, and a display controller 507. Furthermore, the machine condition manager 506 is connected to a scanner controller 504, a printer manager 503, and a printer manager controller 505.

The scanner controller 504 is composed of the scanner 50, the scanner control ASIC, furthermore the scanner control firmware for performing scanner drive control operating at the time of image input and ADF (auto document feeder) control, and the image processing unit.

The printer manager 503 is composed of the printer, printer control ASIC, furthermore printer operation control firmware for performing the printer control during printing and paper conveying control, and image processing firmware on the printer side.

The scanner controller 504 and the printer manager 503 are directly controlled by the respective function module control CPUs and perform communication with the CPU 401 shown in FIG. 3, thereby realize the operations of image input and printing.

The input output controller 502 includes the image processing unit, has an interface with the scanner controller 504 and the printer manager 503, triggers the operation start instruction received from the overall controller 501, and controls the drive timing of the scanner 50 and the image forming unit 52. At the same time, the input output controller 502 performs calculation of the image processing parameter and setting of the image processing unit 409 and controls the copying function. The timing control means, for example, the designation of the drive timing of the ADF 207, scanner drive timing, and timing of qualification process of an image expanded in the memory or print start and the designation of the start timing of the next document.

The display controller 507 is composed of the operation panel 202 of this apparatus explained in FIGS. 4 and 5 and the display control software for controlling it. In this example, the display controller 507 transfers the operation information of the operation panel 202 to the overall controller 501, receives various condition changes generated in the apparatus from the machine condition manager 506 as information, and reflects them on display. Furthermore, the display controller 507 receives information regarding processing results and development such as copy results, the number of copies, and size information from the overall controller 50' and reflects them on display. The reflection method means, concretely, lighting of LEDs on the operation panel and message display to the LCD.

The overall controller 501 further controls the operation condition of the whole apparatus and executes the exclusive control of the resource shared by a plurality of functions of the scanner or printer, priority operation, and screen switching operation. The overall controller 501 also executes the time control of timer monitoring and the menu switching control for the operation panel controller according to the condition when necessary.

The machine condition manager 506 monitors the machine condition notified from the scanner controller 504 or the printer manager 503, concretely, information such as paper jamming, jamming recovery, or front cover open or closed and notifies the overall controller 501 and the display controller 507 of it, thereby reflects the error condition on display or judgment of application of execution of the copy operation.

The printer manager controller 505 is composed of data control software and communication control software for printing image data which are connected from the PRNC 412 shown in FIG. 3 and the PC. The PRNC 412 is composed of an interface such as centronics (IEEE1394), an interface with the system bus 413 shown in FIG. 3, the CPU 401 for executing the protocol control thereof, and the ASIC for executing the data control at high speed.

For example, a document prepared by the application software of the PC is expanded to image data on the PC, then coded and compressed, and stored in the memory of the PC.

The aforementioned coded data is transferred at high speed according to the protocol decided between the PC and the PRNC 412 beforehand.

The PRNC 412 outputs the received image data to the image forming unit 52 shown in FIG. 3.

<<Operation Explanation of the Present Invention Using the Timing Chart>>

Next, the operation of the present invention will be explained hereunder by referring to the drawing showing a timing chart of synchronization control of input and output of the present invention shown in FIG. 8.

Figure 8:
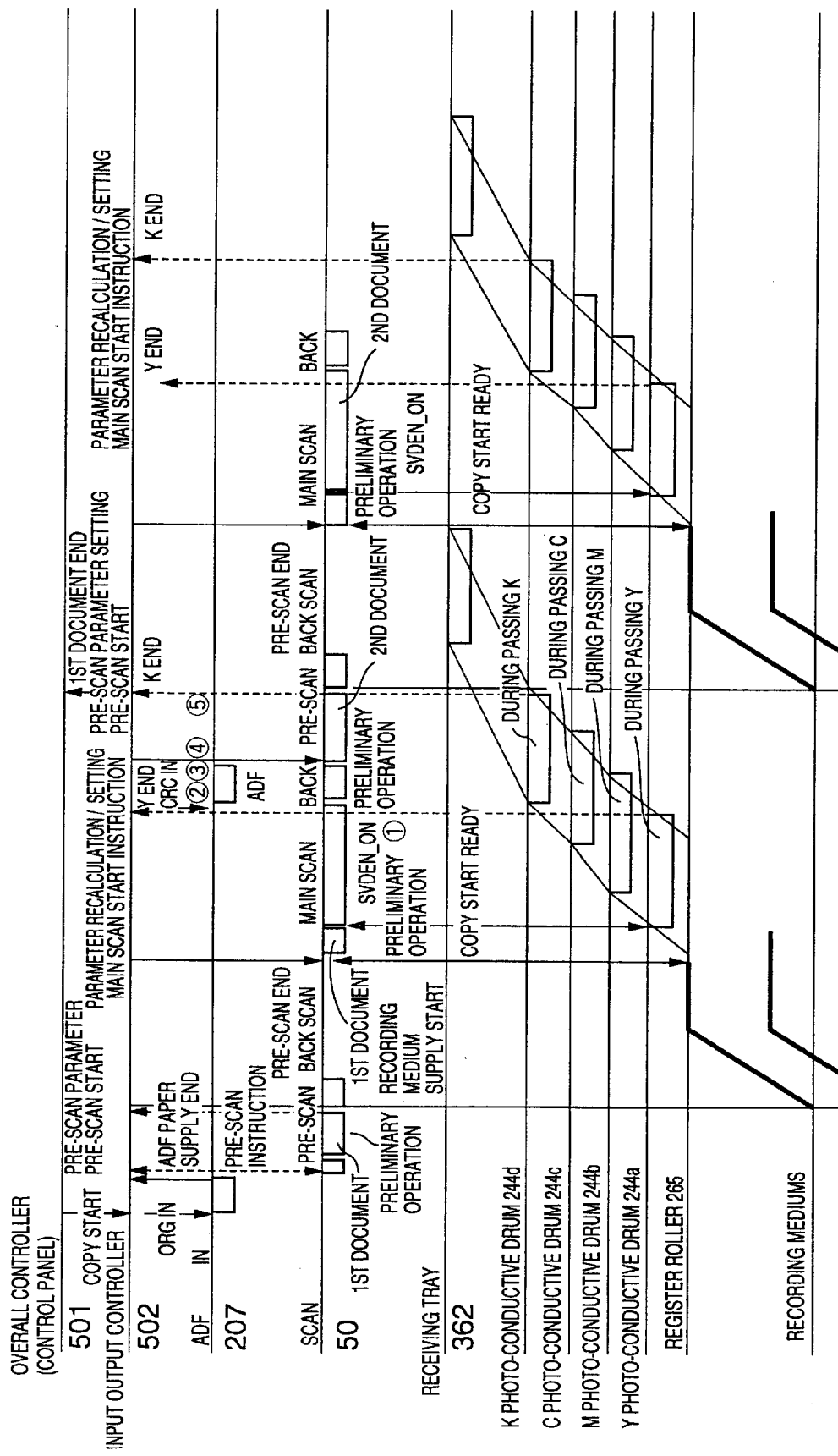
FIG. 8 is a timing chart showing the I/O synchronization control procedure of the color image forming apparatus of the present invention.

The timing chart shown in FIG. 8 indicates a case that the pre-scan operation is accompanied. Firstly, when start is instructed from the operation panel 202, document supply from the ADF 207 is started by the input output controller. When the document supply is finished, pre-scan is instructed to the scanner controller 504. The scanner 50 scans the instructed area at a speed n times of the normal one and when the scanning is finished, the input output controller 502 is notified of the end of pre-scan. Then copy start is instructed to the printer manager 503 from the input output controller 502. When the copy operation is instructed, the printer manager 503 supplies the recording medium to the position of the register roller 265. Then, a synchronization signal meaning copy start ready is sent to the scanner controller 504 from the printer manager 503. When the synchronization signal is sent, the scanner controller 504 starts the scanner operation and at the point of time when the acceleration of the scanner is completed, a synchronization signal (SVDEN_ON) of main scan start is sent from the scanner controller 504 to the printer manager 503. Then, the scanner controller 0.504 and the printer manager 503 synchronously execute the recording medium conveying operation and the document input operation of the scanner. Actually, since the photo-conductive drums 244a to 244d are installed for the four colors, in the State that the scanner operation is finished, it is the point of time when the recording medium passes the top photo-conductive drum 244a. At the point of time, the printer manager 503 notifies the overall controller 501 of that the recording medium passes through the top photo-conductive drum 244a (①) shown in FIG. 8). Then, the overall controller 501 starts document supply from the ADF 207 for the next document. Hereafter, the same procedure is repeated and the copy operation is performed continuously. Back scan shown in the drawing means the operation that the scanner returns to the original position from the state that it is driven and finishes the document input process.

Furthermore, when the document supply from the ADF 207 is completed (③), the pre-scanning is executed (④) and an image of the document is read, and the operation is completed (⑤). Pre-scan detects the density of the substrate of the document, or detects whether an image of the document is colored or monochromatic, or detects whether the document is a document of a photograph or a document of characters.

As mentioned above, the present invention does not perform the operation as conventionally that after the image transfer process to a recording medium by all the photo-conductive drums is completed, the next document is fetched and read by the ADF 207 but as an example, triggers the completion of the first photo-conductive drum (for example, yellow), fetches the next document, and starts the processes including the reading process. By doing this, the processing efficiency per unit time can be improved extremely.

When the recording medium passes through the last photo-conductive drum 244d of K (black), the printer manager 503 notifies the input output controller 502 of the end of K. Upon receipt of the signal, the input output controller 502 notifies the overall controller 501 of it and reflects it on display of the remaining number via the display controller 507 from the overall controller 501.

When pre-scan is not accompanied, that is, when there is no need to collect information regarding the document beforehand and the following document is supplied, to detect the document size information, the input output controller 502 resets the parameter of the image processing unit. The parameter resetting operation at this time cannot be performed for the next document unless a signal of K end is received.

However, when there is no need to acquire the document size, the image processing parameter which is set first is used and the image processing parameter resetting procedure can be omitted. Therefore, at the point of time when the recording medium passes through the first photo-conductive drum 244a, the next document is supplied and then the main scan procedure for the document is started. A case that there is no need to acquire the document size is equivalent to a case that the document size is designated by a user beforehand or a case that when the reading start position of an input document in the main scanning direction is to be decided, the reading position of input data is calculated from the recording medium size and user set magnification. In this case, without supplying a document and resetting a parameter, the main scanning is started immediately, so that compared with a case that recalculation and resetting of an image processing parameter are accompanied, the processing capacity per unit time can be improved.

Figure 9:
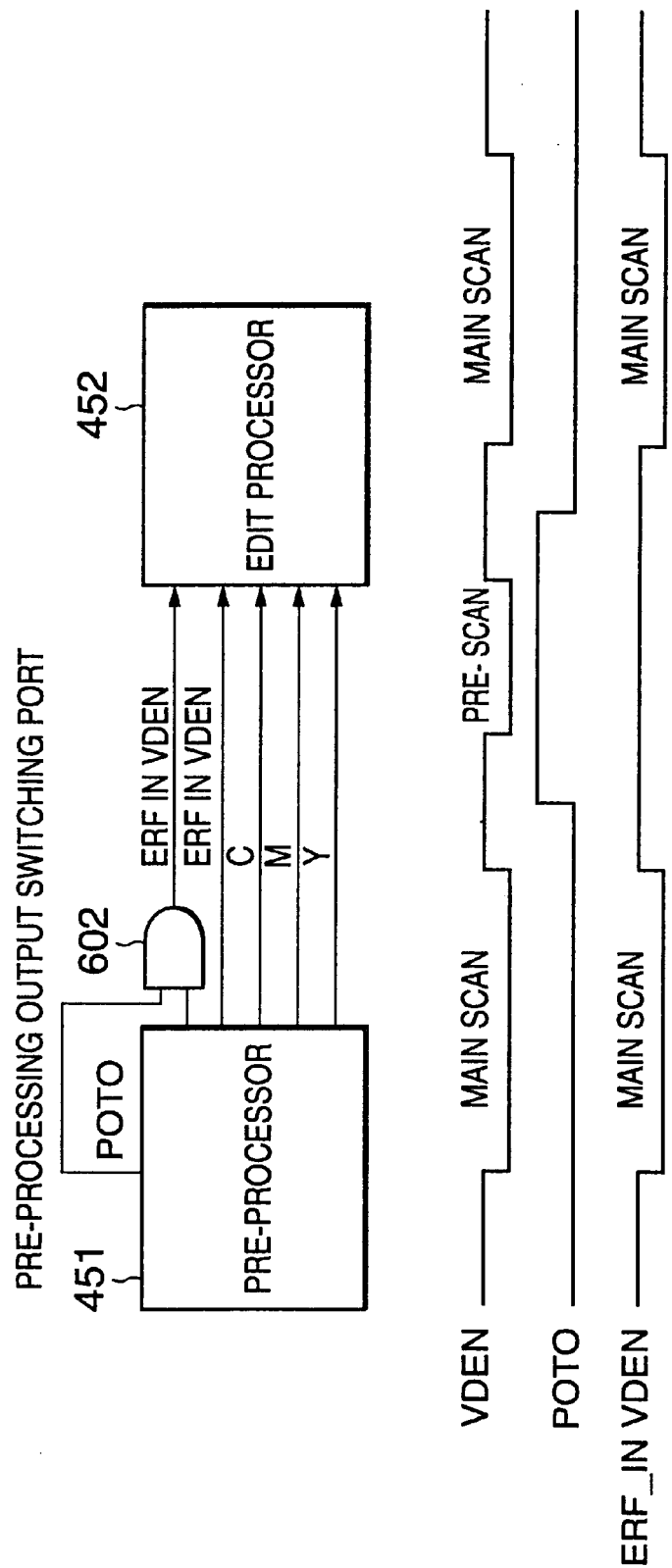
FIG. 9 is a drawing showing a blocking realization means of image data during pre-scanning of the color image forming apparatus of the present invention.

FIG. 9 is a drawing showing a control system for setting no data in the delayed memories 460, 461, 462, and 463 shown in FIG. 6 in the pre-scan process under the synchronization control shown in FIG. 8.

The pre-processor 451 in the image processing unit shown in FIG. 6 converts and sends input image data to C, M, and Y signals of the three primary colors of toner to the edit processors 452, 453, and 454 and the subsequent units at the latter stage. In this case, when an AND circuit 602 is provided and the output switching port shown in FIG. 9 is set at a high level, image data is not output to the image processing unit at the latter stage.

The input output controller 502 sets this port at a high level immediately before the pre-scanning is started and sets the output processors 456, 457, 458, and 459 at the latter stage so that no image data is output to them.

Immediately before main scan start, the input output controller 502 returns the port setting to the original one and switches so that input data is output to the image processing unit at the latter stage.

FIG. 9 shows that in the state that the switching port (POTO) of the pre-processor 451 is set high, no image data is transferred to the ERF_IN VDEN but when the POTO is returned to Low immediately before main scan start, image data is transferred to the image processing ASIC at the latter stage.

Figure 10:
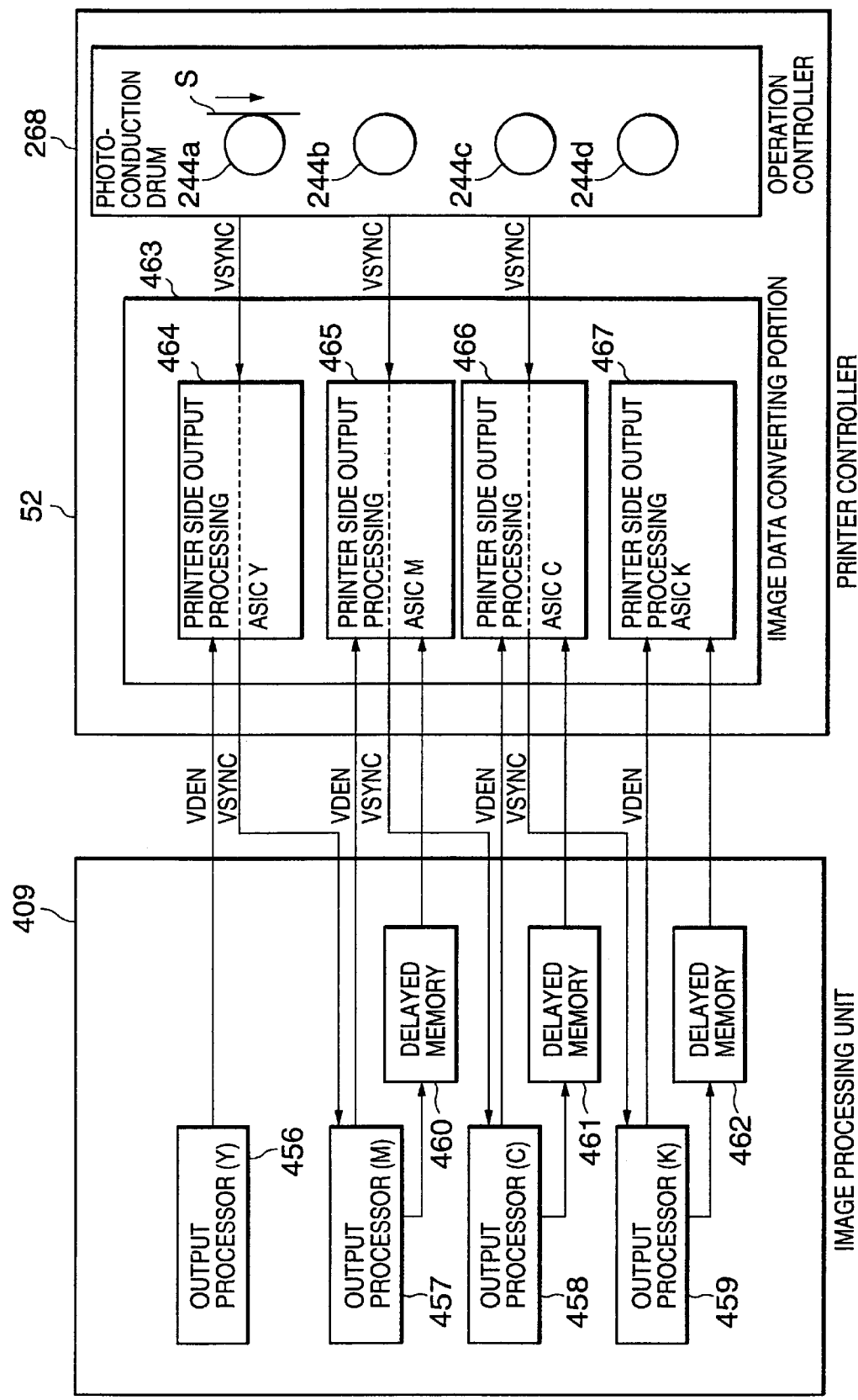
FIG. 10 is a drawing showing the delayed memory synchronization system of the color image forming apparatus of the present invention.

FIG. 10 is a drawing showing the control system for executing the synchronization control regarding the delayed memories 460, 461, and 462 explained in FIG. 6. When the main scanning is started, the vertical side data effective (VDEN) signal is notified to the output processing ASIC Y on the side of the printer manager 503 and an image signal is output to the first photo-conductive drum 244a. At the stage that the recording medium is going to reach the next photo-conductive drum 244b, the VSYNC signal is output to the image processing unit on the input output control side from the operation control side on the side of the printer manager 503. Then, in the output processing ASIC M in the image processing unit on the side of the input output controller 502, the signal is immediately output to the output processing ASIC M on the printer side of the printer manager 503 and in synchronization with it, image data is read from the delayed memory 460. The read image data is processed by the output processing ASIC M on the printer side, converted to laser output for the photo-conductive drum 244b, and transferred onto the recording medium.

Hereinafter, the same procedure is repeated and it is repeated to read image date from each of the delayed memories and output image data to the respective photo-conductive drum units.

<<Operation Explanation of the Present Invention Using a Flow Chart>>

Figure 11:
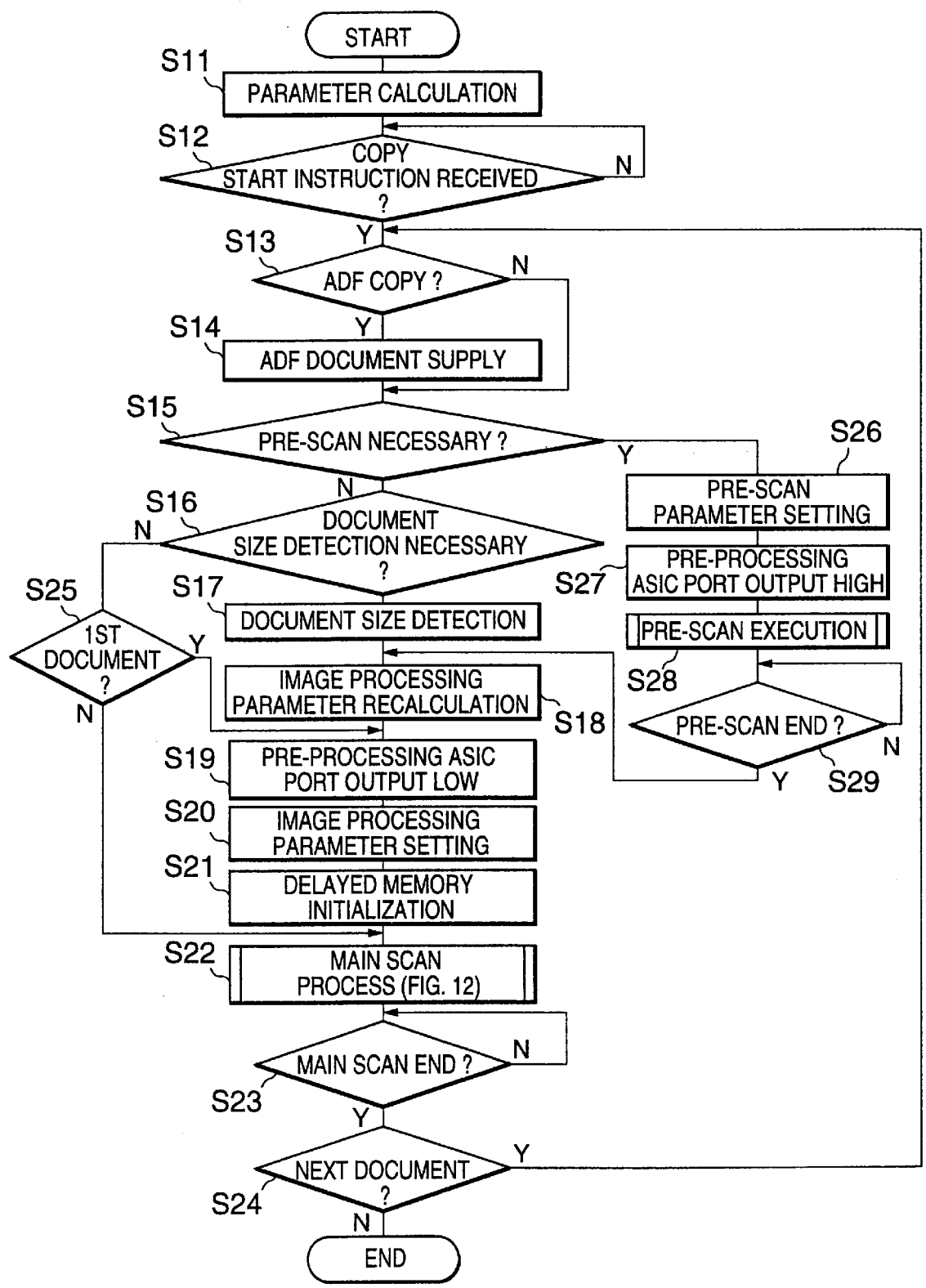
FIG. 11 is a flow chart showing the whole control flow of the color image forming apparatus of the present invention.

FIG. 11 is a control sequence diagram showing the flow of the entire processes regarding the present invention in the copy operation.

When start is instructed (S12) after the image processing parameter is calculated (S11) on the basis of the contents set by the display controller 507 and when the input output controller 502 uses the ADF 207 (S13), document supply is instructed to the scanner 50 (S14). When the ADF document supply is finished and when pre-scan is necessary continuously (S15), the pre-scan image processing parameter is set (S26) and as shown in FIG. 9, the output switching port from the pre-processor 451 of the image processing unit is set high (S27). In this case, the condition that pre-scan is necessary is a case that it is necessary to acquire information regarding the document beforehand. This depends on the copy function to be selected by a user. However, it is not directly related to the present invention, so that detailed description of this condition will be omitted. Then, the input output controller 502 instructs execution of pre-scanning to the scanner controller 504 (S28). When the end of pre-scanning is notified from the scanner controller 504 (S29), the input output controller 502 acquires the information obtained from pre-scan results and executes recalculation of the image processing parameter (S18).

Figure 12:
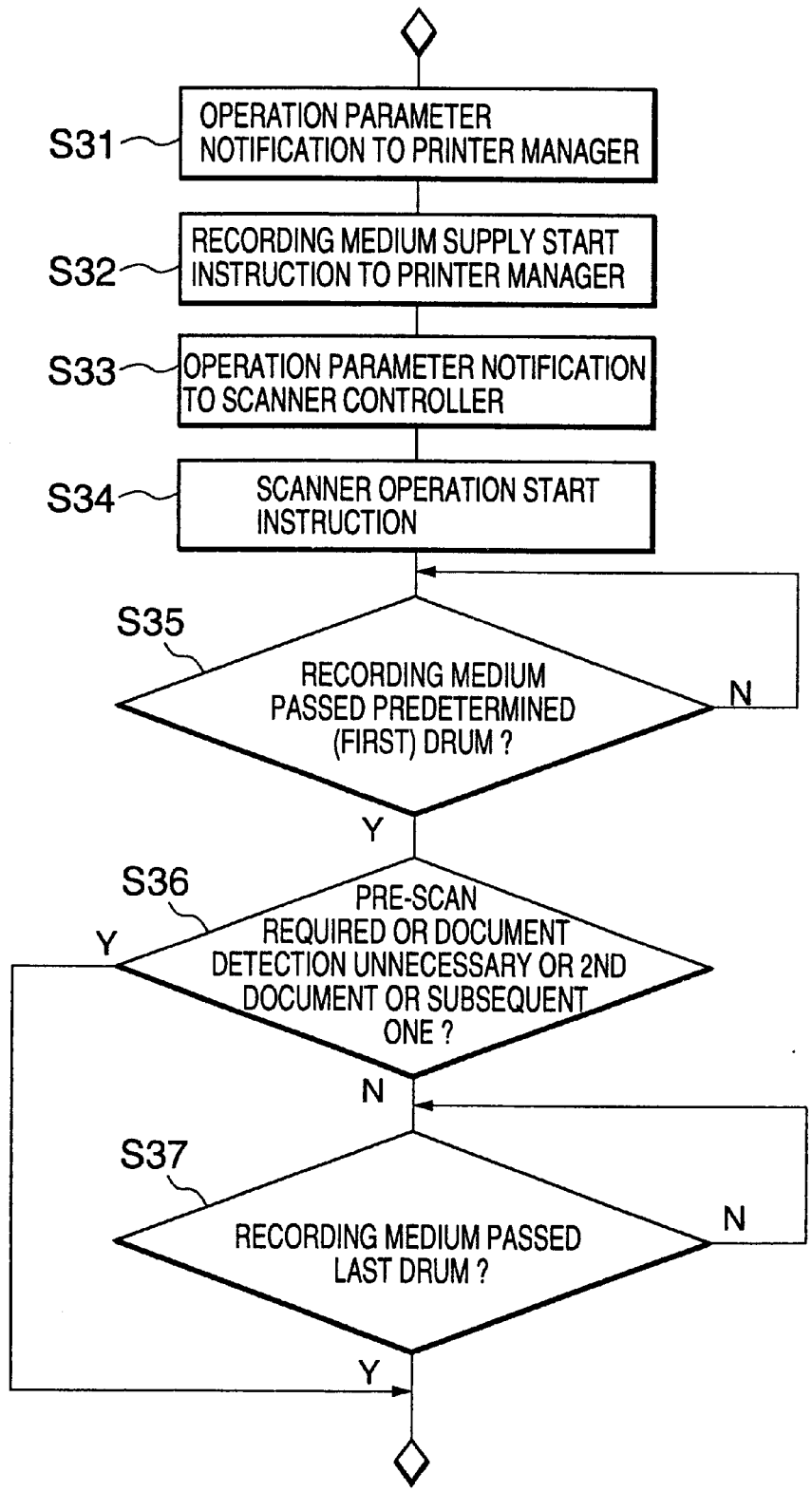
FIG. 12 is a control flow chart showing the processing procedure during main scanning of the color image forming apparatus of the present invention.

Then, the output control port of the pre-processor 451 which is set high before is returned to low (S19), and the image processing parameter is set in the register (S20), and furthermore, the delayed memories are initialized (S21). Then, the main scan operation (S22) whose detailed procedure is shown in FIG. 12 is executed. When the end of the main scan process is notified from the printer manager 503 (S23) and when there is a following document (S24) the supply of the next document is started (S13).

When the aforementioned procedure does not require pre-scan (S15) and requires document size detection, the document size detection is executed (S17). A case that document size detection is required is applicable to a case that the document size is not designated or a case that a function that the document size is required is selected by a user. In such a case, when the size information is detected, the input output controller 502 executes recalculation of the image processing parameter (S18). Hereinafter, in the same way as with the process after the end of pre-scanning, the output control port of the preprocessor 451 is returned to low, and the image processing parameter is set in the register, and furthermore, the delayed memories are initialized (S19 to S21). Then, the main scan operation whose detailed procedure is shown in FIG. 12 is executed (S22). When the end of the main scan process is notified from the printer manager 503 (S23) and when there is a following document (S24), the supply of the next document is started (S13). When the document is not the first document, the image attribute information regarding image data to be input is not changed, so that there calculation, changing, and resetting of the parameter and the resetting process of the delayed memories are not performed and the processing is omitted, thereby the copying capacity per unit time can be improved.

FIG. 12 is a sequence diagram showing the control flow in the main scan process shown in FIG. 11.

When main scan is instructed from the input output controller 502 to the printer manager 503, the input output controller 502 notifies the printer manager 503 of the operation conditions (operation parameters). The operation conditions are applicable to processing information such as document size information, color information, and frame erasing of a recording medium.

Next, the input output controller 502 instructs supply of recording media from the paper supply cassettes to the printer manager 503 (S32), then also notifies the scanner controller 504 of the operation parameter (S33), and instructs operation start to the scanner (S34). As explained in the timing chart shown in FIG. 8, the input output controller 502 executes the main scan operation of image data by synchronizing with the scanner controller 504. Namely, when the back end of the recording medium passes through the first photo-conductive drum 244a after VDEN_ON (①) shown in FIG. 8) (S35), the printer manager 503 notifies the input output controller 502 of it. Upon receipt of the information, for a case that pre-scanning is to be executed, or a case that there is no need to execute document detection, or a case that the second copy during printing of a plurality of copies is to be printed, the input output controller 502 starts the process for the next document (S36).

When pre-scanning is not to be executed and document detection is to be detected (S36), the input output controller 502 waits for the recording medium to pass through the last photo-conductive drum (S37), judges it as the end of main scan, and starts the process for the next document.

The reason of performing such processing is that as described in FIGS. 6 and 11, when the document attributes are changed (for example, changing of the document size), the initialization of the delayed memories is to be executed and hence when the process for the next document is started before the recording medium passes through the last photo-conductive drum 244d, no images are output to the end. When the next process is not accompanied by the initialization of the delayed memories reversely, the input output controller 502 is not required to wait until the recording medium passes through the last photo-conductive drum but can start the process for the next document by seizing the passing through the first photo-conductive drum as a trigger. Therefore, compared with the conventional one, a plurality of documents can be processed in parallel and the processing speed can be increased.

The description of these embodiments allow those who are skilled in the art in the field of the present invention to manufacture and use the present invention easily and these various embodiments are available for those who are skilled in the art in the field of the present invention without an inventive jump. As mentioned above, the present invention is not limited to the described embodiments and is applicable to embodiments in a wide range corresponding to the principle and new characteristics.

For example, it is clear that a trigger of reading of the next document is not limited to the first drum and it may be the end timing of the second photo-conductive drum or may be the timing that a limited time elapses after the processing end of the predetermined photo-conductive drum. Or, it may be an operation at the timing which is given beforehand independently of the processing completion by the predetermined photo-conductive drum. Namely, the present invention has an advantage that at a timing before the timing that the processes by all the photo-conductive drums are finished, the process for the next document can be started and by performing such a timing process, a color image forming apparatus realizing a quicker color image forming process than that of a conventional one can be provided.

According to the present invention, when image data input from the document reading mechanism for inputting image data is to be formed by the image forming mechanism, by switching the operation start timing of the next document to another timing according to the operation conditions selected by a user and the operation phase, a color image forming apparatus for realizing a more rapid throughput can be provided.

Concretely, when image data input from the document reading mechanism for inputting image data is to be printed and output by the image forming mechanism, the present invention has a control procedure for starting the document reading means for the next document by seizing the processing end of the photo-conductive drum unit for the first color among the photo-conductive drum units existing for each color as a trigger and a control procedure for starting the document reading means for the next document by seizing the processing end of the photo-conductive drum unit for the last color as a trigger and by switching them according to the copy conditions, a color image forming apparatus for realizing a more effective throughput is provided.

Further concretely, in a digital color copying machine for forming a color image by the four-tandem system that photo-conductive drums of four colors of Y, M, C, and K are arranged in series, the present invention has a method for seizing that the recording medium passes through the first photo-conductive drum as a trigger and starting the document reading means for the next document and a method for seizing that the recording medium passes through the last photo-conductive drum as a trigger and starting the document reading means for the next document and by switching the two according to the copy conditions, the processing capacity per each time can be improved effectively.

What is claimed is:

1. A color image forming apparatus comprising:

reading means for continuously reading color images from a plurality of documents to output color image data corresponding to the color images;

color image forming means for forming color images on a recording medium using a plurality of image forming units which are provided to form images for a plurality of color signals constituting the color image data on the basis of the color image data read by the reading means; and control means for controlling the reading means to start reading of a next document of the document corresponding to images under image forming when a predetermined image forming unit finishes image forming among the plurality of image forming units before the color image forming is finished.

2. A color image forming apparatus according to claim 1, wherein the reading means includes pre-scan means for detecting beforehand at least one of a density of a substrate of the document, a kind of a color of the document, and a kind of an image on the document to output a detection result.

3. A color image forming apparatus according to claim 2, wherein the detection result output from the pre-scan means is used to set an image forming parameter.

4. A color image forming apparatus according to claim 2, wherein the control means includes means for controlling the image forming means to prevent the plurality of image forming units from forming images when the pre-scan means operates.

5. A color image forming apparatus according to claim 1, wherein the reading means includes conveying means for automatically conveying the plurality of documents.

6. A color image forming apparatus according to claim 1, wherein the image forming means includes four image forming units arranged along a moving direction of the recording medium.

7. A color image forming apparatus according to claim 1, wherein the image forming means forms a color image on the recording medium on the basis of given operation conditions.

8. A color image forming apparatus according to claim 7, wherein the control means includes:

first control means for controlling the reading means to start reading of a next document of the document corresponding to images under image forming when the first image forming unit finishes image forming among the plurality of image forming units before the the color image forming is finished; and second control means for controlling the reading means to start reading of a next document of the document corresponding to images under image forming when the last image forming unit finishes image forming among the plurality of image forming units before the color image forming is finished.

9. A color image forming apparatus according to claim 8, wherein the reading means includes conveying means for automatically conveying the plurality of documents.

10. A color image forming apparatus according to claim 9 further comprising:

execution means for selecting one of the first control means and the second control means to execute the selected control means according to a given operation conditions.

11. A color image forming apparatus according to claim 8, wherein the image forming means includes four image forming units which are arranged along the moving direction of the recording medium and correspond to four color signals of yellow, magenta, cyan, and black.

12. A color image forming apparatus according to claim 11, wherein:

the first control means, when image attribute information of the color image data according to the plurality of documents to be output by the reading means are respectively common, controls the reading means to start reading of a next document of the document corresponding to images under image forming when the image forming unit corresponding to a first yellow signal finishes image forming among the plurality of image forming units before the plurality of image forming units of the color image forming means all finish image forming on the recording medium; and the second control means, when image attribute information of the color image data according to the plurality of documents to be output by the reading means are not respectively common, controls the reading means to start reading of a next document of the document corresponding to images under image forming when the image forming unit corresponding to a last black-signal finishes image forming among the plurality of image forming units before the plurality of image forming units of the color image forming means all finish image forming on the recording medium.

13. A color image forming apparatus according to claim 12, wherein the reading means includes conveying means for automatically conveying the plurality of documents.

14. A color image forming apparatus according to claim 1, wherein:

the color image forming means forms color images on a recording medium on the basis of a given operation condition using a plurality of image forming units which are provided to form images for four-color signals of yellow, magenta, cyan, and black constituting the color image data on the basis of the color image data read by the reading means;

the first control means, when the operation condition given to the color image forming means is to form a plurality of images for an image of one document, controls the reading means to start rereading of a document corresponding to images under image forming when the image forming unit of the first yellow component finishes image forming among the plurality of image forming units before the plurality of image forming units of the color image forming means all finish image forming on the recording medium; and the second control means, when the operation condition given to the color image forming means is not to form a plurality of images for an image of one document, controls the reading means to start reading of a next document of the document corresponding to images under image forming when the image forming unit of the last black component finishes image forming among the plurality of image forming units before the plurality of image forming units of the color image forming means all finish image forming on the recording medium.

15. A color image forming apparatus comprising:

reading means for continuously reading color images from a plurality of documents to output color image data corresponding to the color images, color image forming means for forming color images on a recording medium using a plurality of image forming units which are provided to form images for a plurality of color signals constituting the color image data on the basis of the color image data read by the reading means; and control means for controlling the reading means to start reading of a next document of the document corresponding to images under image forming at a predetermined timing given beforehand before the color image forming is finished.

16. A method for forming color images using a plurality of image forming units corresponding to a plurality of color signals constituting color image data, comprising the steps of:

continuously reading color images from a plurality of documents to output color image data corresponding to the color images;

forming color images for a plurality of color signals constituting the color image data using the plurality of image forming units on the basis of the color image data read in the reading step and transferring the images onto a recording medium; and starting reading of a next document of the document corresponding to images under image forming when a predetermined image forming unit finishes image forming among the plurality of image forming units before the color image forming is finished.

17. A method for forming color images using a plurality of image forming units corresponding to a plurality of color signals constituting color image data, comprising the steps of:

continuously reading color images from a plurality of documents to output color image data corresponding to the color images, forming color images for a plurality of color signals constituting the color image data using the plurality of image forming units on the basis of the color image data read in the reading step and transferring the images onto a recording medium; and starting reading of a next document of the document corresponding to images under image forming at a predetermined timing given beforehand before the color image forming is finished.

* * * * *